United States Patent [19]

Tomidokoro

[11] Patent Number: 4,634,249
[45] Date of Patent: Jan. 6, 1987

[54] FILM HOLDER FOR PUTTING MARKS ON FILM

[75] Inventor: Kanji Tomidokoro, Tokyo, Japan
[73] Assignee: Kamamura Photographic Co., Ltd., Osaka, Japan
[21] Appl. No.: 721,447
[22] Filed: Apr. 9, 1985
[51] Int. Cl.[4] ............................................. G03B 17/24
[52] U.S. Cl. ..................................... 354/108; 354/283
[58] Field of Search ............... 354/105, 106, 107, 108, 354/109, 283, 284, 285

[56] References Cited

U.S. PATENT DOCUMENTS

| | | | |
|---|---|---|---|
| 1,267,159 | 5/1918 | Zuckerman | 354/105 |
| 1,323,364 | 2/1919 | Hood | 354/105 |
| 1,330,235 | 2/1920 | Boxell | 354/105 |
| 2,946,271 | 7/1960 | Craig | . |
| 3,091,168 | 5/1963 | Craig | . |

Primary Examiner—A. A. Mathews
Attorney, Agent, or Firm—Birch, Stewart, Kolasch & Birch

[57] ABSTRACT

In a film holder, a slot for receiving a marking member is made in a bottom flap of the film holder along the inner edge of the bottom flap. The slot is shaped such that when the marking member is inserted into the slot, a part of the marking member is opposed to a photo sensitive material and another part of the member is projected from the slot above the inner edge. Therefore, the marks or characters can be put on the photo sensitive material through the exposure to a photographing light.

1 Claim, 4 Drawing Figures

4,634,249

FILM HOLDER FOR PUTTING MARKS ON FILM

BACKGROUND OF THE INVENTION

1. Field of the Invention

The present invention relates to a film holder for putting or introducing on a film or a photo-sensitive material marks or characters such as marks indicative of photographing studio, year and date or necessary matters such as marks indicative of reproductions, upon photographing.

2. Description of the Prior Art

In cameras using rolls of films, it is well known to put year and date on a film, but in photographic film/plate holders for sheets of films or dry-plates, this has not been carried out. However, recently, the number of film holders which have been photographed and sent to developing laboratories so that the films held within the film holders are developed in the developing laboratories has been increasing with the spread of color photography. When a number of the same configuration of film holders and the same configuration of films from photographing studios are handled, the developed films may be unidentified in a developing laboratory in some cases. Moreover, film holders and dark slides can be identified by directly writing marks or characters thereon, but films can not be identified since marks cannot be written on films.

THE SUMMARY OF THE INVENTION

It is therefore an object of the present invention to provide a film holder for putting marks or characters on films or photo-sensitive materials upon photographing to facilitate the distinction.

This object is accomplished by providing a film holder which comprises a slot made along the inner edge thereof for removably receiving a marking member which is inserted into the slot with a part thereof opposed to a photo-sensitive material, so that the marks or characters exposed to the photographing light upon photographing may be put on the end edge of the sensitive material.

According to the present invention, a film holder includes a slot for receiving a marking member. The slot is made in a bottom flap of the film holder along the inner edge thereof and is shaped such that the marking member is inserted with a part thereof opposed to a photo-sensitive material and with another part thereof projected from the slot above the inner edge. Therefore, the marks or characters can be put on the photo-sensitive material by a photographing light. Thus, the film holder according to the present invention is extremely convenient in the identification of the developed sensitive materials, and is simple in handling and further, has a practical great effect.

BRIEF DESCRIPTION OF THE DRAWINGS

The above and other objects of the invention will become apparent from the following description taken in conjunction with the accompanying drawings in which.

DESCRIPTION OF THE PREFERRED EMBODIMENT

Figure 1:
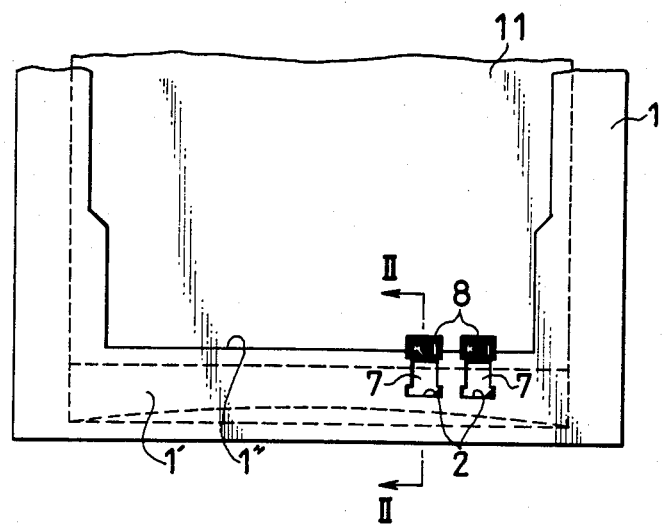
FIG. 1 is a front view illustrating a part of a film holder according to the present invention.
Figure 2:
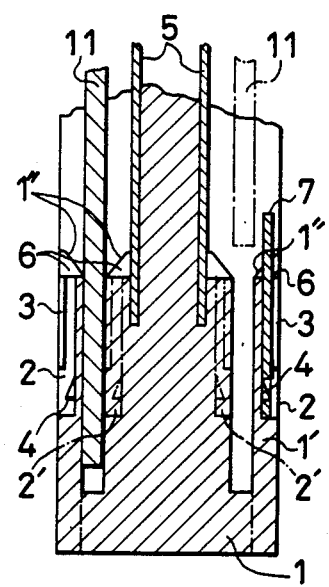
FIG. 2 is an enlarged sectional view taken along the line II—II of FIG. 1, illustrating the details of the film holder.
Figure 3:
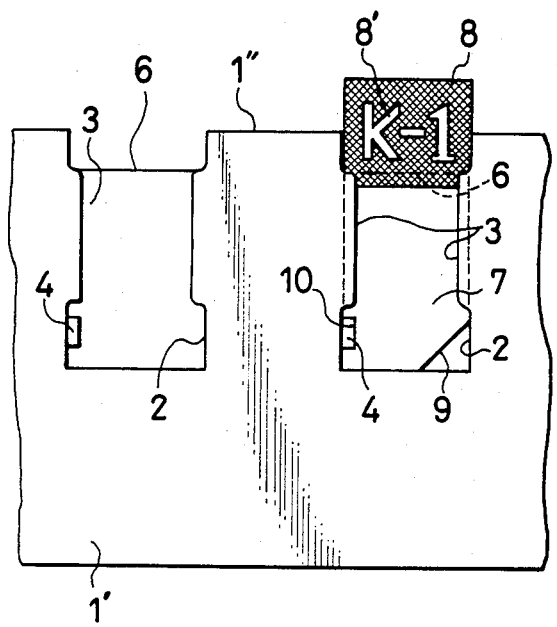
FIG. 3 is a cutaway side view of the film holder.
Figure 4:
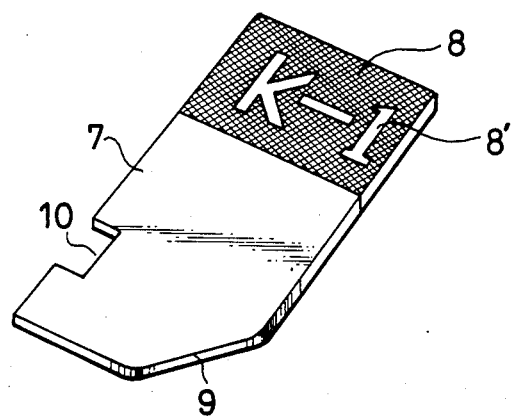
FIG. 4 is a perspective view of a marking member of the film holder.

Referring to FIGS. 1 to 3, there is shown a double-sided film holder of an embodiment according to the present invention, which is denoted by the reference numeral 1. The film holder 1 has two slots 2 each made in a bottom flap 1' along the inner edge 1" thereof for receiving a marking member 7.

The slot 2 forms a dovetail configuration together with a projected edge 3 formed at the opposite sides of the slot 2, and has a stop 4 formed at its lower part. A notch 6 may be made in the inner edge 1" to be flush with the end edge of a photo-sensitive material or a sheet of film 5.

The marking member 7 has a marked surface 8 at its upper portion, and a notch 9 and a lock portion 10 at its lower portion. The marked surface 8 has a mark or character 8' made thereon by punching, writing or the like.

When the sheets of films 5 are loaded in the film holder 1 and dark slides 11 are inserted into the latter, the sheets of films 5 are perfectly blocked from the light. Then, the marking member 7 having the surface 8 marked with the mark or character 8' is guided in and inserted into the dovetail-shaped slot 2. Consequently, the marking member 7 is held by the projected edge 3 with the stop 4 being engaged in the lock portion 10, so as to be prevented from being pulled out.

In this state, the film 5 is not exposed through the marking member 7 becuase of the presence of the dark slide 11.

In photographing, when the film holder 1 is loaded in a camera and the dark slide 11 is pulled out, the marked surface 8 of the marking member 7 is directly opposed to the sheet film 5. As the shutter of the cameral is released, the mark or character 8' is also exposed to the photographing light and therefore the film 5 is exposed to the light through the mark. Consequently, the shape corresponding to mark is put on the film. The mark or character thus put on can serve to identify the developed film.

When the marking member 7 inserted in the slot 2 is to be removed out, the notch 9 helps a person to lift up the marking member 7 from the notch 9 by the fore end of a nail or the like. At this time, the lock portion 10 can be disengaged from the stop 4, thus making it possible to replace the marking members 7.

In the above embodiment, the slot 2 for receiving the marking member 7 is provided in the bottom flap 1' on the front of the dark slide 11, so that it can be replaced with another one as the film or photo-sensitive material is left loaded. In some cases, however, the mark or character may grow faint to become vague. In a modification, a receiving slot 2' may be made in a portion of the film holder inside of the dark slide 11 at the bottom flap 1'. A current film holder is molded of a synthetic resin material and the bottom flap 1' thereof is designed to be openable around the lower edge, so that the marking member 7 can be inserted into and removed out of the receiving slot 2'. This modification has an advantage in that the mark or character is more clear, and is also preferred.

What is claimed is

1. A photographic film holder for putting marks on film, which comprises a bottom flap forming a part of said film holder and having an inner edge, a slot formed in said bottom flap and extending downwardly of said inner edge of said bottom flap, and a marking member having marks or characters on a part thereof and positioned in said slot, said slot being shaped such that said marking member is positioned in said slot with said part of said member opposed to a photo-sensitive material within said holder and projected above said slot so that said marks or characters are photographically put on the photo-sensitive material through the exposure to a photographing light.

* * * * *